(No Model.)
J. CHANTRELL.
TOOL HANDLE.
No. 337,242. Patented Mar. 2, 1886.
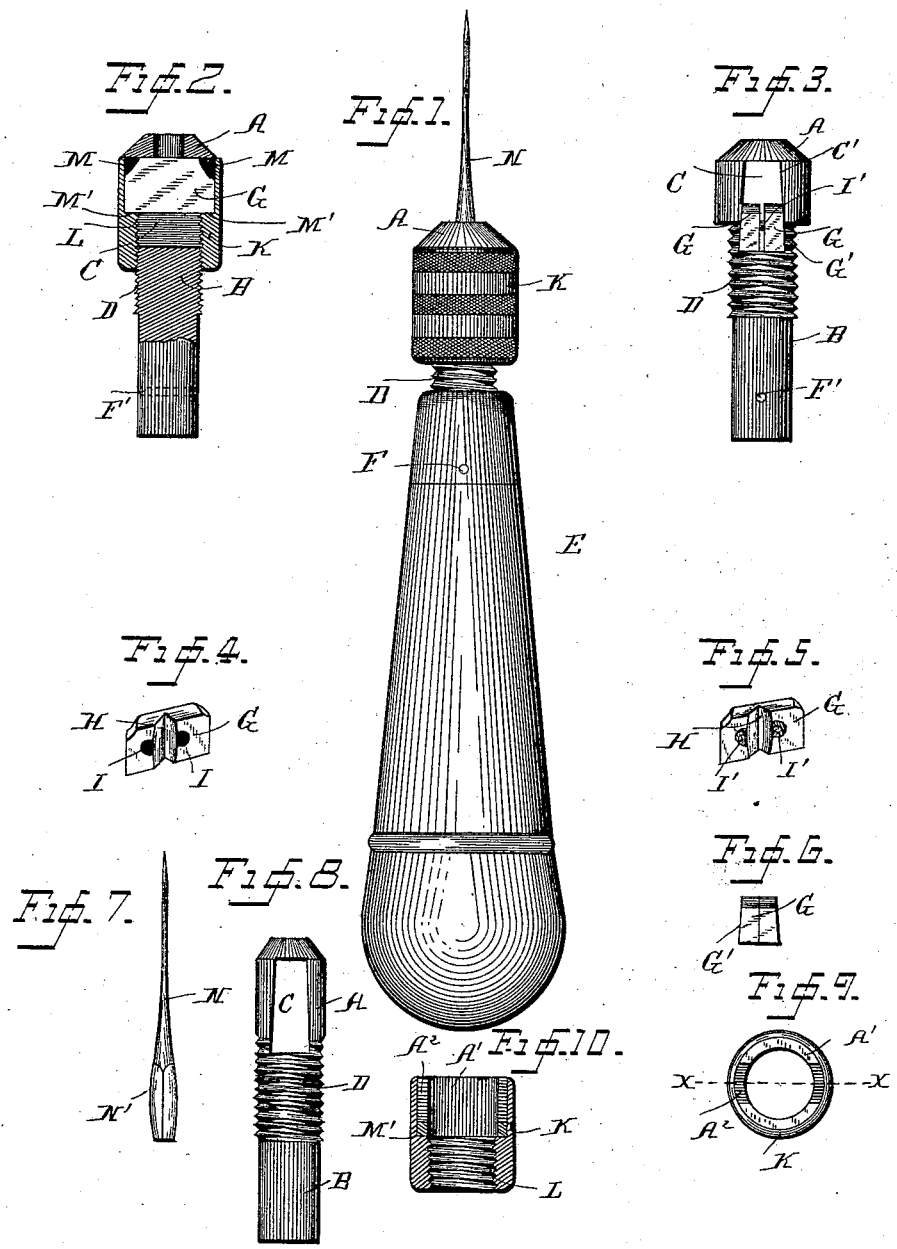
Witnesses
Wm H Jones
J. T. Wooster
Inventor
John Chantrell
By J. T. Wooster
Atty.

UNITED STATES PATENT OFFICE.

JOHN CHANTRELL, OF READING, PENNSYLVANIA, ASSIGNOR TO THE READING HARDWARE COMPANY, OF SAME PLACE.

TOOL-HANDLE.

SPECIFICATION forming part of Letters Patent No. 337,242, dated March 2, 1886.

Application filed August 14, 1885. Serial No. 174,373. (No model.)

*To all whom it may concern:*

Be it known that I, JOHN CHANTRELL, a citizen of the United States, residing at Reading, in the county of Berks and State of Pennsylvania, have invented certain new and useful Improvements in Tool-Handles; and I do hereby declare the following to be a full, clear, and exact description of the invention, such as will enable others skilled in the art to which it appertains to make and use the same.

My invention has for its object to produce a tool-handle which shall be simple in construction, consisting of few parts, all easily and cheaply made, but which will be quick to act, will hold a tool beyond the possibility of its being pulled out while in use, and will not get out of repair. With these ends in view I have devised the simple and novel construction which I will now describe, referring by letters to the accompanying drawings, forming part of this specification, in which—

Figure 1 is an elevation of the device complete and ready for use—that is, with a tool firmly clamped in position; Fig. 2, a cross-section with the jaws in elevation and raised to their highest position; Fig. 3, an elevation of the shank and head with the sleeve removed, the jaws having dropped down to their fully-opened position. Figs. 4 and 5 are detail views of the two jaws. Fig. 6 is a detail view showing the jaws in end elevation in their closed position. Fig. 7 is a view of one of the tools; and Figs. 8, 9, and 10 are detail views illustrating a modification.

The head A and shank B are made in a single piece, having a central slot, C, through it, whose sides C' incline inward slightly from the bottom toward the top. The shank below the head is provided with a screw-thread, D. E is the handle proper, into which the shank extends and is held by a pin, F, engaging a hole, F', in the shank, or in any suitable manner.

G G are the jaws, preferably made without shanks, whose backs G' are inclined to correspond with the inclined sides of slot C, in which they move vertically.

H H are grooves or notches in the faces of the jaws, which receive the tool to be held. They are preferably made slightly wider at the center than at the ends, as will be again referred to. One of the jaws is provided on its face with holes I, and the other jaw with pins I', which engage therewith, whereby the jaws are held against vertical displacement.

K is the sleeve, which is provided with an internal screw-thread, L, to engage the thread upon the shank. At the upper portion of the sleeve the internal diameter is enlarged, forming a recess, M, which receives the head and the jaws. The jaws rest upon the bottom M' of said recess, and are raised thereby when the sleeve is turned forward.

N represents a tool whose shank N' corresponds in shape with notches H in the jaws, being preferably made widest at the center, as clearly shown in Fig. 7, thus giving the jaws a stronger hold upon the tool than could be got by friction alone.

The operation is as follows: Supposing a tool to be in the jaws, to loosen it the sleeve is rotated backward, which permits the jaws to drop down to the position in which they are shown in Fig. 3, when the tool may be readily drawn out. To insert a tool, the jaws must be allowed to drop down to their opened position, as shown, which permits the tool to pass in between the jaws. The sleeve is now rotated forward, which raises the jaws. As the jaws are raised, the inclines G' upon their backs come in contact with the corresponding inclines C' upon the head, which act to close the jaws firmly upon the shank of the tool. A quick forward movement of the sleeve locks the tool beyond the possibility of its being drawn out. It will of course be understood that the screw-thread upon the sleeve and shank may be either right-or-left handed, and that the device is perfectly well adapted to hold all classes of tools, it being customary in this class of handles to provide a receptacle in the base of the handle in which the tools may be carried.

I do not desire to limit myself to the exact construction shown, as it is obvious that the details may be considerably varied without departing from the spirit of my invention, the gist of which consists in providing a pair of short sliding jaws having no shanks, which have movement in a slot in the head, are lifted by a sleeve, and are closed upon the shank of the tool by the inclined sides of said slot. In the modified form the head is made substantially the same size as the shank, and the space between the head and the sleeve is filled by a loose ring or band, A', having cut-away portions A², directly opposite each other, to accommodate the ends of the jaws. The ring or band rests upon the bottom M' of the recess M in the sleeve, and the jaws when in their lowered position rest upon the bottom of the cut-away portions A².

Fig. 8 shows the head in elevation. Fig. 9 is a plan view showing the ring or band in place within the sleeve, and Fig. 10 is a cross-section on the line $xx$ in Fig. 9.

Having thus described my invention, I claim—

1. In a tool-handle, the head and shank made integral and having a slot whose sides taper upward and inward, loose jaws adapted to move in said slot, and a rotating sleeve which, when moved upward, carries the jaws against the inclines, thus closing them against the shank of the tool.

2. The head and shank made in a single piece and having a slot through it whose sides are inclined upward and inward, and an external screw-thread, in combination with loose jaws which move in said slot, and a sleeve having a screw-thread which engages the shank, and a recess which receives the jaws.

3. The combined head and shank having a cross-slot whose sides taper upward and inward, loose angular jaws adapted to move in said slot, whose faces are provided, respectively, with pins I', and holes I to receive them, whereby vertical displacement is prevented, and an external sleeve threaded to engage the shank, and having a recess, the bottom of which carries the jaws when in use.

4. In a tool-handle, a pair of jaws without shanks, and having parallel faces and inclined backs, in combination with a head having a slot with inclined sides, in which the jaws slide, and a sleeve having a recess, the bottom of which carries the jaws against the sides of the slot, whereby they are closed.

5. In a tool-handle, a pair of jaws having parallel faces and inclined backs, in combination with a head having a slot with inclined sides, in which the jaws slide, a sleeve adapted to carry the jaws against the sides of the slot, and a loose ring or band lying between the sleeve and the head.

In testimony whereof I affix my signature in presence of two witnesses.

JOHN CHANTRELL.

Witnesses:
JAMES R. KENNEY.
CHAS. P. HAZELTINE.